United States Patent [19]

Suhoza

[11] 4,269,761

[45] May 26, 1981

[54] ALKYLNAPHTHALENE SULFONIC ACID SALTS AS FILLER DEACTIVATORS IN POLYOLEFINS

[75] Inventor: Richard A. Suhoza, Norwalk, Conn.

[73] Assignee: R. T. Vanderbilt Company, Inc., Norwalk, Conn.

[21] Appl. No.: 20,106

[22] Filed: Mar. 12, 1979

[51] Int. Cl.$^3$ ............................................... C08K 5/42
[52] U.S. Cl. ........................... 260/45.7 S; 260/42.14; 260/42.45; 260/42.57; 260/45.9 R
[58] Field of Search ................ 8/89; 260/42.14, 42.16, 260/42.57, 45.7 SF, 505 C, 505 N, 42.45, 45.9 R

[56] References Cited

U.S. PATENT DOCUMENTS

| | | | |
|---|---|---|---|
| 2,063,416 | 12/1936 | Weiland et al. | 260/505 C |
| 2,072,153 | 3/1937 | Bruson et al. | 260/505 C |
| 2,409,671 | 10/1946 | Faust | 260/505 C |
| 2,687,420 | 8/1954 | Brady | 260/505 N |
| 2,764,548 | 9/1956 | King et al. | 260/505 C |
| 2,777,008 | 1/1957 | Kern et al. | 260/42.57 |
| 2,779,784 | 1/1957 | Sharrah | 260/505 N |
| 3,137,672 | 6/1964 | Lehane, Jr. | 260/42.57 |
| 3,153,564 | 10/1964 | Morgan | 8/89 |
| 3,432,472 | 3/1969 | Caldwell | 260/30.8 R |
| 3,476,698 | 11/1969 | Osterrieth et al. | 260/45.7 SF |
| 3,553,158 | 1/1971 | Gilfillan | 260/42.45 |
| 3,767,444 | 10/1973 | Zeisberger | 260/42.57 |
| 3,953,565 | 4/1976 | Mizutani et al. | 260/42.57 |
| 4,048,138 | 9/1977 | Miga | 260/42.45 |
| 4,116,897 | 9/1978 | Huszar et al. | 260/42.57 |

Primary Examiner—Maurice J. Welsh
Assistant Examiner—R. A. White
Attorney, Agent, or Firm—Rasma B. Balodis

[57] ABSTRACT

A method for enhancing the thermal stability of polymeric compositions containing inorganic fillers and conventional stabilizers by adding as filler deactivator normal and overbased ammonium, alkali metal and alkaline earth metal salt of monoalkyl- and dialkylnaphthalenesulfonic acid and stabilized compositions thereof.

6 Claims, No Drawings

ALKYLNAPHTHALENE SULFONIC ACID SALTS AS FILLER DEACTIVATORS IN POLYOLEFINS

This invention relates to heat stabilized polymeric compositions containing inorganic fillers and filler deactivators for same.

Various inorganic materials of synthetic and mineral origin are added as fillers or extenders to polymeric substances to impart specific properties required in certain fields of application and for economic reasons to provide relatively low cost products. Particularly attractive are inexpensive fillers such as silicate minerals. The inclusion of fillers in the polymeric composition generally alter the physical properties of the product. For certain applications, physical properties such as tensile strength, elongation, flexural modulus, hardness, heat distortion, melt index and electrical properties can be controllably varied by selectively adding a certain type of filler and varying the amount added.

Disadvantageously, fillers affect the stability of the polymeric composition. Therefore, the amount of filler that can be added without detrimental effects is rather limited. Particularly affected is stability against degradation due to action of oxygen at elevated temperatures, generally designated as thermal stability.

It is known to protect polymeric compositions against thermal decomposition by adding various antioxidant and stabilizer systems. However, most antioxidants and stabilizers at normal stabilizing levels have proved to be ineffective in polymers compounded with inorganic fillers. The inclusion of substantial amounts of fillers into polymeric compositions tend to reduce drastically the thermal stability of the filled compositions, often to a level no higher than that of the unstabilized polymer.

Although we do not wish to be bound by any particular hypothesis, presumably the degrading action of fillers on the oxidation stability of the stabilized polymeric composition is due to some type of sorption mechanism. It appears that conventional antioxidants and stabilizers are sorbed on the surface of the fillers while the polymeric composition is in the melt state. While the mode of interaction between the filler and the antioxidant is not fully elucidated, presumably fillers to a diffeent degree possess active sites at which certain constituents are adsorbed from the polymer in its melt state. Consequently, melted and resolidified compositions are left defenseless against the attack by oxygen because considerable part or all of the antioxidant is firmly bound by the filler and not available for the intended function of a stabilizer.

In the past, fillers have been rendered inactive toward stabilizers by such methods as coating with a polymeric material or modifying its surface by chemical means. The sorption mechanism can be also counteracted by treatment with organic compounds containing the polar groups epoxide, aliphatic hydroxyl, ester, amide, ether and sulfide as described in U.S. Pat. No. 3,553,158 to Gilfillan.

It has been now discovered that certain metal and ammonium salts of aromatic acids are preferentially sorbed on inorganic fillers without causing discoloration and detrimental effects on the physical properties of the polymeric product.

In the past, alkylarylsulfonic acids have been added to polymeric compositions in the capacity of surfactants to improve the mechanical and rheological properties of the compositions as described in U.S. Pat. No. 4,116,897 to Huszár et al. These sulfonic acid type surfactants do not contribute significantly to the heat stability of filled polymeric systems. Surprisingly, it has been discovered that the salt form of alkylnaphthalenesulfonic acid promotes the heat stability of filled polymeric compositions by counteracting the interaction between the filler and the antioxidant. Preferentially the salts are sorbed on the surface of the filler at the active sites, thus leaving the antioxidant free to function as intended.

SUMMARY OF THE INVENTION

The invention relates to a stabilized polymeric composition comprising an inorganic filler and about 0.5 to 15 parts per hundred parts resin of filler deactivating salts of alkylnaphthalenesulfonic acid selected from the group consisting of normal salts of the formula

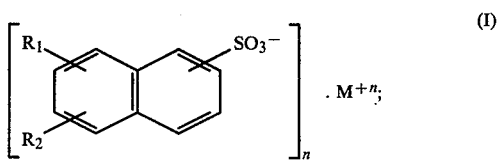

overbased salts of the formula

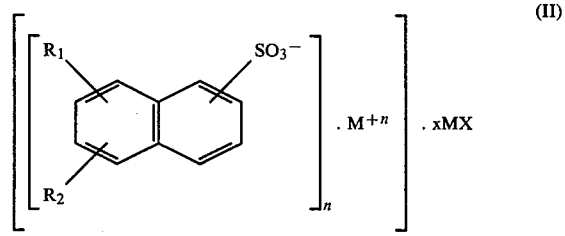

and mixtures thereof wherein
$R_1$ = nonyl, dodecyl;
$R_2$ = H, nonyl, dodecyl;
M = ammonium radical, Group IA and Group IIA metals;
n = 1–2;
x > 1
X = anion of a base, anion of a weak acid.

The composition further contains about 0.05 to 10 parts per hundred parts resin of antioxidants.

According to another aspect of the invention, filled polymeric compositions are stabilized by deactivating inorganic fillers contained therein by adding about 0.5 to 15 parts based on hundred parts polymer of filler deactivator selected from the group consisting of normal and overbased ammonium and metal salts of alkylnaphthalenesulfonic acid of formulae I and II and mixtures thereof.

DETAILED DESCRIPTION OF THE INVENTION

Certain salts of alkylnaphthalenesulfonic acid act as filler deactivators due to preferential sorption on the surface of the filler at the active sites as compared to that of stabilizers and antioxidants. The alkylnaphthalenesulfonic acid salts that function as filler deactivators are oleophilic in character. The salts may be selected from alkali metal, alkaline earth metal and ammonium salts of monoalkyl- and dialkylnaphthalenesulfonic acid.

The salts may be normal or overbased with respect to their metal content. The normal salts have a normal equivalent molar ratio of metal to acid. The alkylnaphthalenesulfonic acid salts are prepared by known processes. For illustration, the normal salts can be prepared by a method described in U.S. Pat. No., 2,764,548 to King et al and German Offen. No. 2,600,179 to Gallacher et al (incorporated herein by reference).

The overbased salts are characterized by stoichiometric excess of metal relative to the number of equivalents of the organic acid. The salt can be further characterized by a base number which is a function of the metal content. A typical base number will range from 1 to 400, but may be higher for salts overbased under certain conditions. For purposes of the invention, the ratio of metal to acid of the overbased salts is not critical.

Although the structure of the overbased salts is not fully understood, they are presumed to be complexes of normal salts. The excess metal is present in the form of oxides, hydroxides, carbonates and similar salts of bases and weak acids. The excess metal is introduced in the molecule by dispersing bases, salts of weak acids and carbon dioxide in the reaction media by known methods. For example, such salts are prepared by methods described in U.S. Pat. No. 3,057,896 to Schlicht et al and U.S. Pat. No. 3,429,811 to Robbins et al.

Preferred are the commonly available salts of ammonium, the alkali metals lithium, sodium, potassium, and the alkaline earth metals magnesium, calcium, barium and strontium. Particularly preferred salts are, among others, sodium monododecylnaphthalenesulfonate, ammonium dinonylnaphthalenesulfonate, calcium dinonylnaphthalenesulfonate, calcium monododecylnaphthalenesulfonate, magnesium dinonylnaphthalenesulfonate, overbased calcium dinonylnaphthalenesulfonate and overbased calcium monododecylnaphthalenesulfonate.

The deactivators of the invention can be used to deactivate synthetic inorganic fillers and silicate minerals, e.g. kaolin, montmorillonite, bentonite, talc, and wollastonite, natural and synthetic calcium carbonate, carbon black and glass microspheres of the hollow and solid type. The amount of filler incorporated into the polymer depends on the physical properties desired, type of polymer and to some extent, economical consideration and can be selected by anyone skilled in the art. Depending on the particular application, the amount of filler can range from about 1 to 300 parts per hundred parts resin (PHR) and preferably about 20 to 100 PHR.

The filler deactivator is added in sufficient amount to deactivate the filler and will depend on the type and amount of filler used. Generally, the deactivator will be added in the amount of about 0.5 to 15 PHR and preferably about 0.8 to 2.5 PHR.

The alkylnaphthalenesulfonic acid salts of the invention are effective in enhancing the resistance to deterioration due to heat of filled polymeric materials susceptible to such degradation. Particularly susceptible to oxidative degradation in the presence of fillers are polyolefins such as low density polyethylene, high density polyethylene, polypropylene, polybutylene, polyisobutylene, polypentylene and polyisopentylene and polystyrene; copolymers of olefins such as ethylene-propylene copolymers.

The synthetic polymers can be prepared by methods well known in the art. The polymers can be in any physical form including films, coatings, sheets, molded articles, latex and foam.

The filler deactivators can be employed alone or, preferably, in combination with other conventional heat stabilizers for the particular synthetic polymer. Suitable stabilizers include, among others, phenols; arylamines; organic phosphites; phosphates, thiophosphites, or thiophosphtes of dialkyl hydroquinone; and thio acid esters, particularly dithiocarbamic acid esters and their metal salts. More specifically, the phenol stabilizers may contain one or more phenolic hydroxyl groups. Such phenol stabilizers may have a sterically hindered or polynuclear structure. With the bicyclic phenol stabilizers, the rings can be linked together by thio, oxyether, alkylene, alicyclidene or arylidene groups. Representative phenol stabilizers include, among others, 2,4-di-t-butylphenyl-3,5-di-t-butyl-4-hydroxybenzoate; 4,4'-butylidene bis(6-t-butyl-m-cresol); 4,4'-oxybis(3-methyl-6-isopropylphenol); tetrakis[methylene-3-(3,5'-di-t-butyl-4'-hydroxyphenyl)propionate]methane; 1,3,5-trimethyl-1,4,6-tri[3,5-di-t-butyl-4-hydroxybenzyl]benzene; 2,6-di-t-butyl-p-cresol, and resorcinol and its 4-alkyl derivatives. Particularly preferred is tris(3,5-di-t-butyl-4-hydroxybenzyl)isocyanurate.

Representative arylamines include alkylated diphenylamines, especially 4,4'-dioctyldiphenylamine and sym-di-β-naphthyl-p-phenylenediamine.

The organic phosphite stabilizers that may be incorporated into the polyolefin compositions may have one or more organic radicals attached to the phosphorus atom through an oxygen atom. Compounds having bivalent organic radicals forming a heterocyclic ring with the phosphorus atom are also suitable. Exemplary organic phosphites are, among others, phenyl di-2-ethylhexyl phosphite, tridodecyl phosphite, diphenyl phosphite and from the phenolic phosphites, bis[4,4'-thiobis (2-t-butyl-5-methylphenol)]isooctyl phosphite, and cyclic neopentanetetrayl bis(octadecyl phosphite).

The satisfactory phosphates, thiophosphites, or thiophosphates, or thiophosphates of dialkyl hydroquinone include, among others, 3,5-di-t-butyl-4-hydroxyphenyl-phosphate and thiophosphite, 3-methyl-5-t-butyl-4-hydroxyphenyl thiolophosphate, and di-n-amyl(α-methyl-3-ethyl-5-isopropyl-4-hydroxybenzyl)phosphonate. Distearyl thiodipropionate, among others, is a satisfactory thio acid ester.

Preferred are mixed stabilizer systems comprising a primary antioxidant and a secondary antioxidant. For filled polyolefin compositions, a particulaly preferred stabilizer system is a mixture of about 0.1 to 5 PHR tris(3,5-di-t-butyl-4-hydroxybenzyl) isocyanurate, primary antioxidant, and about 0.3 to 15 PHR distearyl thiodipropionate, secondary antioxidant. Optionally, the antioxidant system can be formulated as a concentrate in a media which is easily dispersable in the polymer.

Depending on the polymeric system, the stabilizer will be present in the amount of about 0.05 to 10 PHR, preferably 0.05 to 1.0 PHR.

In addition, other conventional additives such as secondary antioxidants, light stabilizers, plasticizers, internal lubricants, emulsifiers, antistatic agents, flameproofing agents, antimicrobial agents and pigments can be employed in compounding the filled polymers.

The following examples are given for further illustration of the invention and are not intended in any way to limit the invention.

All percentages and parts are based on weight unless otherwise indicated.

EXAMPLE 1

Powdered polypropylene resin Profax 6501 was dry-blended with fillers, filler deactivator, antioxidant and a secondary antioxidant as indicated hereinbelow. The dry blend was charged on a two-roll mill at 165° C. The compound is fluxed for approximately five minutes at which time it is sheeted off at 0.050 inches and allowed to cool. The milled sheet is compression molded at 182° C. for five minutes at 20,000 psi to a thickness of approximately 0.025 inches. From this molded slab 2×2 inch specimens are cut and placed on a glass plate for aging in an air ciculating oven at 150° C. Samples are observed daily by visual inspection and rotated in the oven from top to bottom and side to side.

Failure occurs when embrittlement begins, usually evidenced in the form of yellow to orange spots which subsequently spread over the total surface area of the specimen.

The test data compiled in Table 1 below indicate that compositions containing the filler deactivator calcium monododecylnaphthalenesulfonate have improved heat stability as compared to those containing only antioxidants.

TABLE 1

| OVEN STABILITY AT 150° C. | | | | | | | | |
|---|---|---|---|---|---|---|---|---|
| Formulation, in parts | 1 | 2 | 3 | 4 | 5 | 6 | 7 | 8 |
| Profax 6501[1] | 60 | 60 | 60 | 60 | 60 | 60 | 60 | 60 |
| Talc, NYTAL ® 200[2] | 40 | 40 | 40 | 40 | 40 | 40 | 40 | 40 |
| Tris(3,5-di-t-butyl-4-hydroxbenzyl) isocyanurate | 0.1 | 0.1 | 0.1 | | 0.2 | 0.2 | 0.2 | |
| Distearyl thiodipropionate | | 0.2 | 0.2 | | 0.2 | 0.2 | 0.2 | |
| Calcium monododecyl-naphthalenesulfonate | | | 0.5 | | | 0.5 | | 0.5 |
| Oven aged at 150° C. | | | | | | | | |
| Hours to Degradation: | 24 | 38 | 197 | 102 | 215 | 1100 | 24 | 24 |

[1]Manufactured by Hercules, Inc.
[2]Manufactured by R. T. Vanderbilt Company, Inc.

EXAMPLE 2

Powdered polypropylene resin Profax 6501 was dry-blended with two grades of kaolin clay and antioxidant blend. Overbased calcium salt of dinonylnaphthalenesulfonate having a base number of 50 was added as filler deactivator. The specimens were prepared and tested for thermal stability as described in example 1.

The test data compiled in Table 2 below demonstrate that compositions containing the filler deactivator have considerbly higher thermal stability than those containing antioxidant blend and no filler deactivator of the invention.

| OVEN STABILITY AT 150° C. | | | | | | |
|---|---|---|---|---|---|---|
| Formulation, in parts | 9 | 10 | 11 | 12 | 13 | 14 |
| Profax 6501 | 74.1 | 74.1 | 74.1 | 74.1 | 74.1 | 74.1 |
| Antioxidant, EXXON CD300 concentrate[1] | 15.9 | 15.9 | 15.9 | 15.9 | 15.9 | 15.9 |
| Peerless No. 3 Clay[2] | 60 | | 60 | 60 | | |
| Dixie Clay[2] | | 60 | | | 60 | 60 |
| Overbased calcium dinonylnaph-thalenesulfonate | | | 0.9 | 1.8 | 0.9 | 1.8 |
| Oven aged at 150° C. | | | | | | |
| Hours to dedgradation | 96 | 72 | 709 | <1200 | 398 | 909 |

[1]Manufactured by EXXON Chemical Company
[2]Manufactured by R. T. Vanderbilt Company, Inc.

EXAMPLE 3

Pelletized polypropylene resin Profax 6523 (prestabilized) is charged to a preheated two roll mill and allowed to soften. The softened resin is fluxed for 1 minute and a preblended mixture of filler and filler deactivator is slowly added to the resin. The compound is fluxed for about five minutes and sheeted off at 0.050 inches and allowed to cool. Specimens are prepared and tested according to the method described in Example 1.

The test data compiled in Table 3 below indicate that the salts of the invention provide compositions of improved thermal stability. By comparison, formulation 22 containing the free acid deteriorates in relatively short time upon exposure to elevated temperatures. Tables 3, and 4 and 5 show similar results.

The above embodiments have shown various aspects of the present invention. Other variations will be evident to those skilled in the art and such modifications are intended to be within the scope of the invention as defined by the appended claims.

TABLE 3

| Formulation in parts | OVEN STABILITY AT 150° C. | | | | | | | | | | | | | | | | |
|---|---|---|---|---|---|---|---|---|---|---|---|---|---|---|---|---|---|
| | 15 | 16 | 17 | 18 | 19 | 20 | 21 | 22 | 23 | 24 | 25 | 26 | 27 | 28 | 29 | 30 | 31 |
| Profax 6523[1] | 100 | 100 | 100 | 100 | 100 | 100 | 100 | 100 | 100 | 100 | 100 | 100 | 100 | 100 | 100 | 100 | 100 |
| Dixie Clay | 40 | 40 | 40 | 40 | 40 | 40 | 40 | 40 | 40 | 40 | 40 | 40 | 40 | 40 | 40 | 40 | 40 |
| Ammonium dinonyl-naphthalenesulfonate | | 0.8 | 1.2 | 1.6 | 2.0 | | | | | | | | | | | | |
| Calcium monododecyl-naphthalenesulfonate | | | | | | 1.6 | 2.0 | | | | | | | | | | |
| Dinonylnaphthalene-sulfonic acid | | | | | | | | 2.0 | | | | | | | | | |
| Magnesium dinonyl-naphthalenesulfonate | | | | | | | | | 2.0 | | | | | | | | |
| Calcium dinonyl-naphthalenesulfonate | | | | | | | | | | 0.8 | 1.2 | 1.6 | 2.0 | | | | |
| Sodium monododecyl-naphthalenesulfonate | | | | | | | | | | | | | | 0.8 | 1.2 | 1.6 | 2.0 |
| Oven aged at 150° C. | | | | | | | | | | | | | | | | | |
| Hours to degradation | 24 | 108 | 168 | 228 | 248 | 570 | 780 | 48 | 192 | 144 | 232 | 476 | 624 | 192 | 264 | 360 | 432 |

[1]Manufactured by Hercules Inc.

TABLE 4

| OVEN STABILITY AT 150° C. | | | | | | | |
|---|---|---|---|---|---|---|---|
| Formulation in parts | 32 | 33 | 34 | 35 | 36 | 37 | 38 |
| Profax 6523 | 100 | 100 | 100 | 100 | 100 | 100 | 100 |
| Dolomite | 40 | 40 | 40 | 40 | 40 | 40 | 40 |
| Sodium monododecyl-naphthalene- | | 0.4 | 1.2 | 2.0 | | | |

TABLE 4-continued

OVEN STABILITY AT 150° C.

| Formulation in parts | 32 | 33 | 34 | 35 | 36 | 37 | 38 |
|---|---|---|---|---|---|---|---|
| sulfonate | | | | | | | |
| Calcium Dinonyl-naphthalene-sulfonate | | | | 0.4 | 1.2 | 2.0 | |
| Oven aged at 150° C. | | | | | | | |
| Hours to Degradation | 740 | 1332 | 2030 | 2162 | 1632 | 2272 | 2884 |

TABLE 5

OVEN STABILITY AT 150° C.

| Formulation, in parts | 39 | 40 | 41 | 42 | 43 | 44 | 45 |
|---|---|---|---|---|---|---|---|
| Profax 6523 | 100 | 100 | 100 | 100 | 100 | 100 | 100 |
| Wollastonite, VANSIL W-20[1] | 40 | 40 | 40 | 40 | 40 | 40 | 40 |
| Calcium dinonyl-naphthalene-sulfonate | | 0.4 | 1.2 | 2.0 | | | |
| Sodium monodo-decylnaphthalene-sulfonate | | | | | 0.4 | 1.2 | 2.0 |
| Oven aged at 150° C. | | | | | | | |
| Hours to degradation: | 1284 | 2212 | 2530 | 2908 | 2139 | 2152 | 2440 |

[1]Manufactured by R. T. Vanderbilt Company, Inc.

I claim:

1. An improved stabilized polyolefin composition containing an inorganic or mineral filler and antioxidants wherein the improvement comprises:

about 0.5 to 15 parts and preferably 0.8 to 2.5 parts based on hundred parts polymer of a filler deactivator selected from a group consisting of normal salts of alkylnaphthalenesulfonic acid of the formula $$\left[ R_1 \underset{R_2}{\underset{|}{\bigodot\bigodot}} SO_3^- \right]_n \cdot M^{+n};$$  (I)

overbased salts of the formula $$\left[ R_1 \underset{R_2}{\underset{|}{\bigodot\bigodot}} SO_3^- \right]_n \cdot M^{+n} \cdot xMX;$$  (II)

and mixtures thereof wherein
$R_1$ = nonyl, dodecyl;
$R_2$ = H, nonyl, dodecyl;
M = ammonium radical, Group IA and Group IIA metals;
n = 1-2;
x > 1
X = anion of a base, anion of a weak acid 2. A composition according to claim 1 wherein the deactivator is normal calcium salt of dinonylnaphthalenesulfonic acid.

3. A composition according to claim 1 wherein the deactivator is normal calcium salt of monododecylnaphthalenesulfonic acid.

4. A composition according to claim 1 wherein the deactivator is normal sodium salt of monododecylnaphthalenesulfonic acid.

5. A composition according to claim 1 wherein the deactivator is overbased calcium salt of dinonylnaphthalenesulfonic acid.

6. An improved method for stabilizing polyolefin compositions containing inorganic or mineral fillers by adding antioxidants wherein the improvement comprises:

adding about 0.5 to 15 parts based on hundred parts polymer of a filler deactivator selected from the group consisting of normal salts of alkylnaphthalenesulfonic acid of the formula:

$$\left[ R_1 \underset{R_2}{\underset{|}{\bigodot\bigodot}} SO_3^- \right]_n \cdot M^{+n};$$  (I)

overbased salts of the formula $$\left[ R_1 \underset{R_2}{\underset{|}{\bigodot\bigodot}} SO_3^- \right]_n \cdot M^{+n} \cdot xMX;$$  (II)

and mixtures thereof wherein
$R_1$ = nonyl, dodecyl;
$R_2$ = H, nonyl, dodecyl;
M = ammonium radical, Group IA and Group IIA metals;
n = 1-2;
x > 1
X = anion of a base, anion of a weak acid.

* * * * *

UNITED STATES PATENT AND TRADEMARK OFFICE
CERTIFICATE OF CORRECTION

PATENT NO. : 4,269,761

DATED : May 26, 1981

INVENTOR(S) : Richard A. Suhoza

It is certified that error appears in the above-identified patent and that said Letters Patent are hereby corrected as shown below:

Column 2, line 46 and column 8, lines 16 and 62
" $x > 1$ " should be -- $x > 1$ and --;

Column 5, line 31 "hydroxbenzyl" should be
--hydroxybenzyl--;

Column 6, line 6 add --TABLE 2 --;

Column 6, line 17 "dedgradation" should be
--degradation--;

Column 8, line 17 "weak acid" should be
--weak acid.--.

Signed and Sealed this

Third Day of November 1981

[SEAL]

Attest:

GERALD J. MOSSINGHOFF

*Attesting Officer*    *Commissioner of Patents and Trademarks*